United States Patent [19]
Vrijssen et al.

[11] Patent Number: 4,857,797
[45] Date of Patent: Aug. 15, 1989

[54] CATHODE RAY TUBE HAVING A TUBULAR ELECTRON GUN STRUCTURE

[75] Inventors: Gerardus A. H. M. Vrijssen; Tjerk G. Spanjer, both of Eindhoven, Netherlands

[73] Assignee: U.S. Philips Corporation, New York, N.Y.

[21] Appl. No.: 156,373

[22] Filed: Feb. 16, 1988

Related U.S. Application Data

[63] Continuation-in-part of Ser. No. 843,367, Mar. 24, 1986, abandoned.

[30] Foreign Application Priority Data

Feb. 17, 1986 [NL] Netherlands ............................ 8600391

[51] Int. Cl.⁴ .......................... H01J 29/62; H01J 29/88
[52] U.S. Cl. .................................... 313/450; 313/414; 313/479
[58] Field of Search ............... 313/450, 412, 413, 414, 313/432, 439, 479

[56] References Cited

U.S. PATENT DOCUMENTS

| | | | |
|---|---|---|---|
| 3,143,681 | 8/1964 | Schlesinger | 313/450 |
| 3,375,390 | 3/1968 | Schlesinger | 313/450 |
| 4,695,775 | 9/1987 | Ritzman et al. | 313/450 X |
| 4,713,879 | 12/1987 | Vrijssen | 313/450 X |

*Primary Examiner*—Kenneth Wieder
*Attorney, Agent, or Firm*—Robert J. Kraus

[57] ABSTRACT

The invention relates to a cathode ray tube having an envelope 1 comprising a screen 2 and an electron gun 3 which is situated inside the envelope 1 opposite to the screen and which has three electrodes 4, 5 and 6, which electrodes are provided coaxially on the inner wall of a glass tube 7 in adjoining places having diameters differing for each electrode. In order to obtain, for example, smaller dimensions and a better alignment of the electron gun and a higher resolution, a focusing lens associated with the electron gun 3 is a high-ohmic resistance layer 8 having a spiral shape 9.

11 Claims, 2 Drawing Sheets

CATHODE RAY TUBE HAVING A TUBULAR ELECTRON GUN STRUCTURE

This is a continuation-in-part of application Ser. No. 843,367 filed Mar. 24, 1986, now abandoned.

BACKGROUND OF THE INVENTION

The invention relates to a cathode ray tube having an envelope comprising a screen and an electron gun situated inside the envelope oppostie to the screen and having at least two electrodes, said electrodes being provided coaxially on the inner wall of a glass tube in adjoining places having diameters which differ for each electrode. The invention furthermore relates to a method of manufacturing a cathode ray tube.

A cathode ray tube of the kind mentioned in the opening paragraph is known from U.S. Pat. No. 4,304,586.

Conventionally, an electron gun is constructed from a beam-forming part consisting of a cathode and a few electrodes which serve to generate, modulate and prefocus an electron beam, and a prefocusing lens which ensures that the beam is focused on the screen of the tube in which the gun is present.

Such a lens in a conventional gun also consists of a number of electrodes. All these electrodes are usually held together by means of a number of insulation rods.

As a reusult of the present-day development towards electron guns of smaller dimensions and electron beams having greater brightness, the requirements as regards the tolerances in the spacings between the electrodes mutually and the alignment of the electrodes become more stringent.

In addition, it is desired to simplify the construction of the electrode system used.

SUMMARY OF THE INVENTION

One of the objects of the invention is to meet the requirements described hereinbefore at least to a considerable extent.

Therefore, the cathode ray tube according to the invention mentioned in the opening paragraph is characterized in that a focusing lens associated with the electron gun is a high-ohmic resistance layer having a spiral shape. Preferably, a beam-forming part associated with the electron gun is also a prefocusing part having a high-ohmic resistance layer having a spiral shape.

A cathode ray tube according to the invention permits small dimensions, narrow tolerances, accurate alignment and simple construction.

The resistance layer serves as a potentiometer. By varying the pitch, the spacing between the turns, or the resistance, a voltage distribution can be obtained which is necessary for a focusing lens having few aberration errors, as they can so far be realized only in lenses having very large diameters. The focusing lens and the prefocusing part may be formed by the same high-ohmic resistance layer.

This resistance layer may be provided on an additional glass tube placed within the envelope.

A preferred embodiment of a cathode ray tube according to the invention is characterized in that the glass tube forms a part of the envelope. When the glass tube forms a part of the envelope fewer parts need to be used in the cathode ray tube. This makes a cathode ray tube according to this embodiment more elegant. Furthermore, the cost price of a cathode ray tube is decreased since fewer parts have to be used.

The cathode ray tube according to the invention is obtained in a particularly simple manner when the glass tube in which the high-ohmic resistance layer and the other electrodes are to be provided is obtained by softening a glass tubular section by heating and drawing it on a mandril.

The high-ohmic resistance layer is then preferably provided on the inside of one end of the glass tube, and the other electrodes are provided on the inside of the other end of the glass tube in places having diameters increasing towards the other end.

These places having increasing diameters are obtained by drawing the part of the tube on a mandril whose diameter changes a few times along a longitudinal axis of the tube (tube axis).

As a result of this, a number of wall parts of the inner wall of the glass tube situated along the tube axis, are disposed at substantially right angles to the tube axis and a number of wall parts are situated parallel to the tube axis.

In this manner, reference faces for the axial and radial positions of the electrodes with respect to the axis of the glass tube are obtained in one operation, as a result of which a very good reproducibility of the resulting electron gun is achieved.

Short, drawn, thin-walled sleeves are preferably used as the other electrodes having an upper plate in the center of which an aperture is present to pass the electron beam. Thin-walled electrodes match the glass wall during the thermal treatment without fracture of the galss tube occurring.

The electrodes can be assembled in the profiled glass tube in a simple manner. In this construction, insulation rods are not necessary.

According to the invention, the high-ohmic resistance layer is obtained by providing on the inner wall of the glass tube at one end a layer of a stable binder-free suspension of ruthenium hydroxide and glass particles, from which layer a ruthenium-oxide-containing electric resistance layer is formed by heating.

A mixture of ammonia and isopropanol is used as a suspension agent.

The high-ohmic resistance layer can be given a spiral shape either prior to or after a thermal treatment.

For contacting the high-ohmic resistance layer it is of importance that before the layer is provided the inside of the tube has a smooth surface without projections or holes and that after forming the spiral this smoothness is not disturbed.

the high-ohmic resistance layer is therefore contacted in that, prior to providing the layer, conical holes are provided by sand-blasting in the wall of the glass tube through which holes wires are threaded which are fused in the holes by means of a crystallizing glass, after which the wires on the inside of the tube are cut off flush with the glass wall and the resistannce layer is then provided.

The high-ohmic resistance layer and the other electrodes can also be contacted simultaneously in that, prior to providing the layer and the other electrodes, conical holes are provided in the wall of the glass tube by sand-blasting, in which holes indium balls are laid, after which wires are threaded which are fused in the holes by means of a crystallizing glass, after which at the area of the resistance layer and the other electrodes to be provided the indium balls are cut off, the resistance layer is provided, the electrodes are assembled and the electron gun is subjected to a thermal treatment.

BRIEF DESCRIPTION OF THE DRAWING

The invention will now be described in greater detail with reference to the accompanying drawing figures, wherein.

DESCRIPTION OF THE PREFERRED EMBODIMENT

Figure 1:
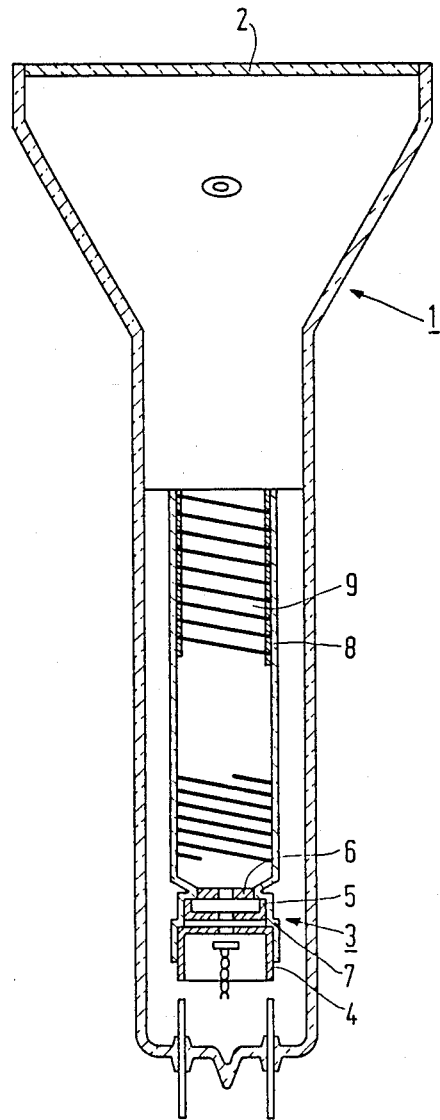
FIG. 1 s a diagrammatic cross-sectional view of a cathode-ray tube according to the invention.

The invention relates, for example, to a cathode ray tube having a glass envelope 1 (see FIG. 1) comprising a screen 2 and having inside the envelope 1 and opposite to the screen 2 an electron gun 3 having three electrodes 4, 5, and 6 which are provided coaxially on the inner wall of a glass tube 7 in adjoining places having diameters differing for each electrode.

According to the invention, a focusing lens associated with the electron gun 3 is a high-ohmic resistance layer 8 having a spiral shape 9.

Figure 2:
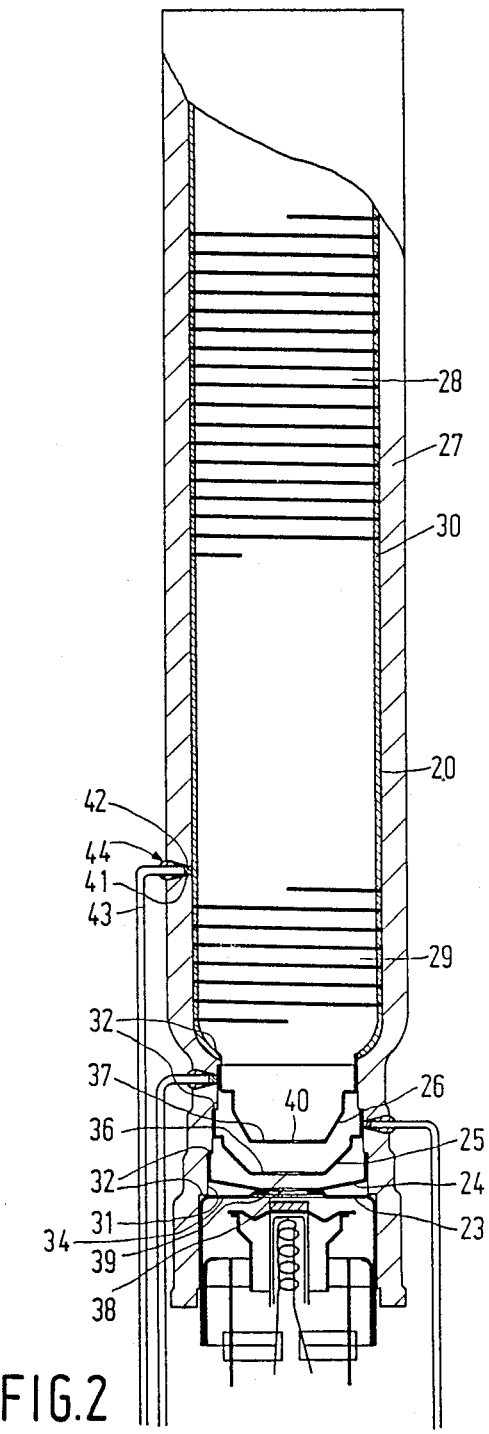
FIG. 2 is a diagrammatic sectional view in greater detail of a cathode-ray tube manufactured by means of a method according to the invention.

FIG. 2 shows the electron gun in greater detail. In this case the electrodes referenced 23, 24, 25 and 26 are provided in the glass tube 27, and 20 denotes the high-ohmic resistance layer and 28 denotes the spiral-like focusing lens.

As compared with the prior art, the electron gun of the cathode ray tube according to the invention means an important improvement, for example, as regards the small dimensions, the brightness of the electron beam, the tolerances in the spacings between the electrodes and their mutual alignment. The diameter of an electron gun in a cathode ray tube according to the invention, for example, may be 1.2 cm. In a prior art cathode ray tube with comparable properties the diameter would be 4 cm.

Preferably, a pre-focusing part of a beam-forming part to which belong, for example, the electrodes 23, 24, 25 and 26 also has a spiral shape 29 in the high-ohmic resistance layer 20.

The electron gun is obtained in a simple manner when the glass tube 27 in which the high-ohmic resistance layer 29 and the other electrodes 23, 24, 25 and 26 have to be provided, is obtained by softening a glass tube section by heating and drawing it on a mandril.

The high-ohmic resistance layer 20 is provided on the inside of one end of the glass tube 27 and the other electrodes 23, 24, 25 and 26 are provided on the inside 31 of the other end of the glass tube 27 in places having diameters increasing towards the other end.

These places of increasing diameter are obtained with great reproducibility and accuracy by drawing the tube section on a mandril whose diameter changes a few times in the longitudinal direction. A glass tube 27 as shown in FIG. 2 is obtained by drawing on a bipartite mandril the parts of which after drawing are removed from the glass tube in opposite directions.

The electrodes 23, 24, 25 and 26 can be assembled in a particularly accurate manner in that during drawing engaging surfaces 32 against which the electrodes 23, 24, 25 and 26 bear are formed in the glass tube.

Preferably electrodes 23, 24, 25 and 26 are short, drawn, thin-walled sleeves having upper plates 34, 35, 36, 37 and 40, respectively, in the center of which apertures 38, 39 and 40, respectively, are present to pass the electron beams.

Such sleeves are easy and accurate to make, so that the mutual distance of the upper plates and the concentricity of the apertures after assembly is also determined accurately (approximately 5 $\mu$m). Moreover, such sleeves easily adapt to the tube surface in subsequent thermal treatments.

The spiral-like focusing lenses 28 and 29 are obtained with good quality and high breakdown voltage by provding on the inner wall of one end of the glass tube 27 a layer of a stable binder-free suspension of ruthenium hydroxide and glass particles, from which the ruthenium-containing electric resistance layer 29 is formed by heating and is given the spiral shapes 28 and 29 mechanically.

Alcoholic ammonia is preferably used as a suspension agent for the ruthenium hydroxide.

The suspension used is obtained, for example, by mixing glass enamel powder with water in a beaker glass. Ruthenium chloride ($RuCl_3$) is dissolved in water and added to the mixture. Ruthenium hydroxide is precipitated in the mixture by the addition of ammonia. The mixture is then allowed to precipitate after which the water is siphoned off and the precipitate is dried.

The dried precipitate is transferred to a ball mill and isopropanol and ammonia are added. The mixture is then ground to obtain well mixed fine particles. Such a suspension is suitable for producing a uniform resistance powder layer. The spiral shapes are scratched in the powder layer after application to the tube.

The pitch in the spiral shape is, for example, 300 $\mu$m and the interruption in the resistance layer 60 $\mu$m. After a firing treatment, these interruptions are highly voltage-resistant. The thickness of the layer is, for example, 1.3 $\mu$m.

The layer is heated at 500° C. for approximately 20 minutes and thus obtains a resistance of $10^7$ ohms/square.

The high-ohmic resistance layer 20 and the electrodes 24, 25 and 26 can be contacted simultaneously in that, prior to providing the layer 20 and the other electrodes 24, 25 and 26, conical holes 41 (0.9×0.4 mm) are formed in the wall of the glass tube by sand blasting, in which holes indium balls 42 are laid and lead-out wires 43 (0.6 mm) are assembled (in order to avoid complexity of the drawing, always only one of the holes, balls and lead-out wires are referenced) which are fused in the holes 41 by means of a conventional crystallizing glass 44.

At the area of the resistance layer 20 and the other electrodes 24, 25 and 26 to be provided, the indium balls are cut off and the electrodes 24, 25 and 26 are assembled.

The electron gun is finally subjected to a thermal treatment, the electrodes 24, 25 and 26 contacting the lead-out wires 43 via indium.

When only a high-ohmic resistance layer 20 is to be contacted, indium balls may be omitted and it will suffice before providing the layer 20, to cut off the ends of the lead-out wires 43 projecting at the area of the layers.

When the electron gun is ready it is mounted in the envelope of the cathode ray tube.

Figure 3:
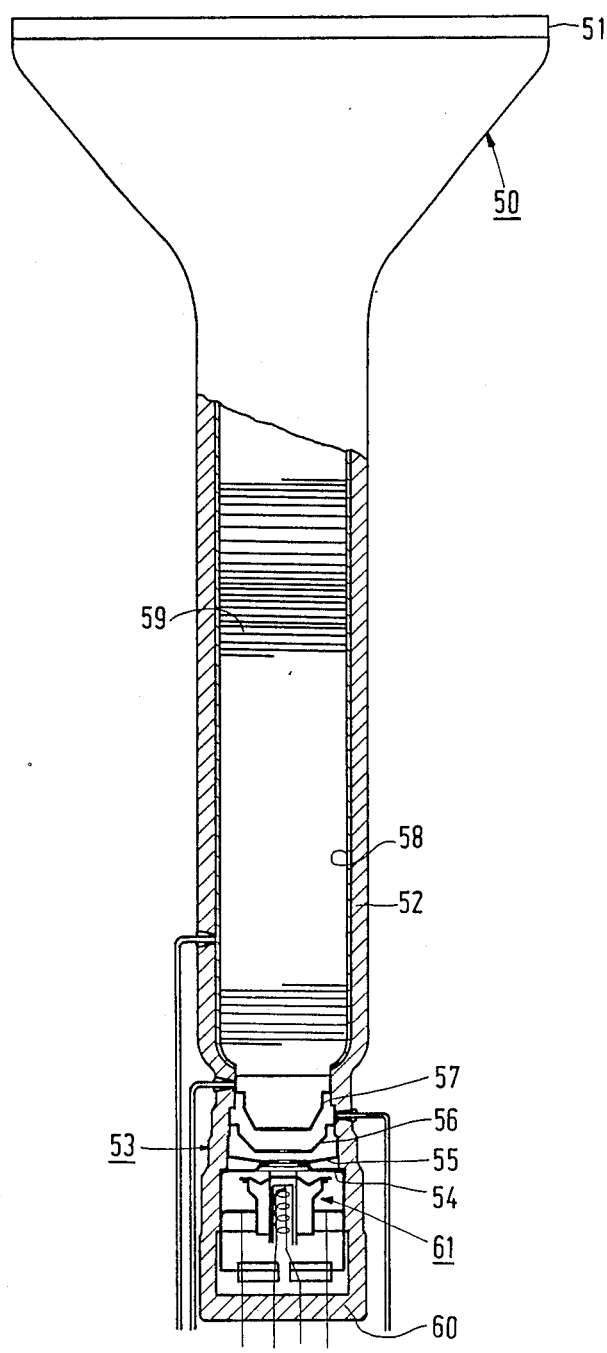
FIG. 3 is a diagrammatic cross-sectional view of a cathode ray tube according to another embodiment of the invention.

Another embodiment of a cathode ray tube according to the invention in which the glass tube forms a part of the envelope comprises a glass envelope (see FIG. 3)

with a screen 51 and a glass tube 52 in which an electron gun 53 is provided. The electron gun 53 comprises a cathode 61 and electrodes referenced 54, 55, 56 and 57 and are provided on the glass tube 52. The high-ohmic resistance layer is denoted by 58 and the spiral-like focusing lens is provided on the inner wall of the glass tube 52. The envelope is closed in an air-tight manner by means of a closing plate 60 through which the connecting wires of the cathode 61 are lead.

It will be obvious that the invention is not restricted to the examples described but that many variations are possible to those skilled in the art without departing from the scope of this invention.

Instead of ruthenium oxide, the high-ohmic resistance layer may also comprise manganese, nickel oxide, thallium oxide and the like.

What is claimed is:

1. A cathode ray tube comprising an envelope containing a screen and an electron gun for producing an electron beam directed at said screen, said electron gun comprising:
    a. an insulating tube having a longitudinal axis and including a portion having a stepped inner surface defined by a plurality of inner wall sections situated at different positions along said axis and having differing perimeters;
    b. a plurality of electrodes disposed in respective ones of the inner wall sections of the insulating tube, said electrodes including means for supporting an electron-emitting cathode and for forming the emitted electrons into the electron beam; and
    c. a high-resistance layer disposed on an inner surface of the insulating tube and forming a spiral focusing lens at a position along the axis which will effect focusing of the electron beam at the screen.

2. A cathode ray tube as in claim 1 where the insulating tube forms an integral part of the envelope.

3. A cathode ray tube as in claim 1 or 2 including a spiral pre-focusing lens formed by the high-resistance layer between the plurality of electrodes and the spiral focusing lens.

4. A cathode ray tube as in claim 1 or 2 where the perimeters of the inner wall sections increase successively with distance from the spiral focusing lens.

5. A cathode ray tube as in claim 4 where the portion of the insulating tube having the stepped inner surface is at one end of said tube.

6. A cahtode ray tube as in claim 5 where the electrodes disposed in the inner wall sections comprise metal sleeves which are sufficiently thin to adapt to dimensional changes in the respective inner wall during thermal manufacturing treatments.

7. A cathode ray tube as in claim 1 or 2 where the high-resistance layer consists essentially of ruthenium oxide formed from a heated binder-free suspension of ruthenium hydroxide and glass particles.

8. A cathode ray tube as in claim 7 where the suspension comprises isopropanol.

9. A cathode ray tube as in claim 1 or 1 including contact means for making electrical contact with the high-resistance layer, said contact means comprising:
    a. a hole through a portion of the insulating tube wall on which the high-resistance layer is disposed;
    b. a conductor extending from the hole and having one end in contact with the layer; and
    c. a crystallizing glass material fused in the hole around the conductor.

10. A cathode ray tube as in claim 1 or 2 including contact means for making electrical contact with at least one of the electrodes, said contact means comprising:
    a. a hole through the respective wall section in which the at least one electrode is disposed;
    b. indium material disposed in the hole in contact with the electrode;
    c. a conductor extending from the hole and having one end in contact with the indium material; and
    d. a crystallizing glass material fused in the hole around the conductor.

11. A cathode ray tube as in claim 10 including contact means for making electrical contact with the high-resistance layer, said contact means comprising:
    a. a hole through a portion of the insulating tube wall on which the high-resistance layer is disposed;
    b. indium material disposed in the hole in contact with the layer;
    c. a conductor extending from the hole and having one end in contact with the indium material; and
    d. a crystallizing glass material fused in the hole around the conductor.

* * * * *